(12) United States Patent
Yogeswaren

(10) Patent No.: US 10,590,762 B2
(45) Date of Patent: *Mar. 17, 2020

(54) N-PHASIC FINITE ELEMENT METHOD FOR CALCULATING A FULLY COUPLED RESPONSE OF MULTIPHASE COMPOSITIONAL FLUID FLOW AND A SYSTEM FOR UNCERTAINTY ESTIMATION OF THE CALCULATED RESERVOIR RESPONSE

(75) Inventor: Elan Yogeswaren, Houston, TX (US)

(73) Assignee: GeoScale, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,345

(22) Filed: Aug. 13, 2012

(65) Prior Publication Data

US 2013/0030782 A1 Jan. 31, 2013

Related U.S. Application Data

(63) Continuation-in-part of application No. 12/562,939, filed on Sep. 18, 2009, now Pat. No. 8,255,195.

(Continued)

(51) Int. Cl.
*G06G 7/48* (2006.01)
*E21B 49/00* (2006.01)
(Continued)

(52) U.S. Cl.
CPC .......... *E21B 49/00* (2013.01); *G06F 17/5018* (2013.01); *G01V 99/005* (2013.01); *G01V 2210/667* (2013.01); *G06F 2217/16* (2013.01)

(58) Field of Classification Search
CPC ........................................................ E21B 49/00
(Continued)

(56) References Cited

U.S. PATENT DOCUMENTS 6,782,947 B2 8/2004 de Rouffignac et al.
6,928,399 B1 8/2005 Watts, III et al.
(Continued)

OTHER PUBLICATIONS

Lee: Assisted Interpretation of Fiber-Optic Data for Smart-Well Completions; SPE 101675;This paper was prepared for presentation at the 2006 Abu Dhabi International Petroleum Exhibition and Conference held in Abu Dhabi, U.A.E., Nov. 5-8, 2006; pp. 1-5.*

(Continued)

*Primary Examiner* — Hugh M Jones
(74) *Attorney, Agent, or Firm* — Norton Rose Fulbright US LLP

(57) ABSTRACT

In an exemplary embodiment, a method is disclosed for developing an N-phasic finite element model for performing fully coupled analyses of multi-phase compositional fluid flow and heat flow in nonlinearly deforming porous solid media with time-dependent failure. The method can include formulating a finite element model of the behavior of a coupled solid-fluid formation, having complex geometry and behavior, and applying the model to derive the response of the formation in the form of one or more displacement fields for the solid phases and one or more pressure fields for the fluid phases in a zone of interest in a formation. In an exemplary embodiment, a system is disclosed for estimating the uncertainties in the derived displacement and pressure field solutions for the response of the fully coupled solid-fluid phases.

33 Claims, 6 Drawing Sheets

Related U.S. Application Data

(60) Provisional application No. 61/098,123, filed on Sep. 18, 2008.

(51) Int. Cl.
*G06F 17/50* (2006.01)
*G01V 99/00* (2009.01)

(58) Field of Classification Search
USPC .......................................................... 703/10
See application file for complete search history.

(56) References Cited

U.S. PATENT DOCUMENTS

| | | | |
|---|---|---|---|
| 7,177,764 B2 * | 2/2007 | Stone | 702/6 |
| 7,603,265 B2 | 10/2009 | Mainguy et al. | |
| 7,953,587 B2 | 5/2011 | Bratton et al. | |
| 8,255,195 B2 * | 8/2012 | Yogeswaren | E21B 49/00 |
| | | | 702/6 |
| 2006/0129366 A1 | 6/2006 | Shaw | |
| 2006/0235666 A1 | 10/2006 | Assa et al. | |
| 2007/0183259 A1 | 8/2007 | Yogeswaren et al. | |
| 2010/0191511 A1 | 7/2010 | Hsu et al. | |

OTHER PUBLICATIONS

Wen et al.: Production Data Integration in Sand/Shale Reservoirs Using Sequential Self-Calibration and GeoMorphing: A Comparison; SPE 78139; first presented at the 2000 SPE Annual Technical Conference and Exhibition, Dallas 2000; 2002; pp. 255-265.*

Gautier et al.: History Matching Using a Streamline-Based Approach and Gradual Deformation; SPE-87821; 2004; pp. 88-101.*

Gai et al.: SPE 79700 Coupled Geomechanical and Reservoir Modeling on Parallel Computers; prepared for presentation at the SPE Reservoir Simulation Symposium held in Houston, Texas, U.S.A; 2003; 11 pages.*

Gai et al., Coupled Geomechanical and Reservoir Modeling on Parallel Computers, SPE 79700, SPE Reservoir Simulation Symposium, Houston, TX, pp. 1-11, 2003.

Fredrich et al., " Geomechanical Modeling of Reservoir Compaction, Surface Subsidence, annd Casing Damage at the Belridge Diatomite Field," SPE 65354, pp. 1-15, Apr. 4, 2000.

Fredrich et al., "Reservoir Compaction, Surface Subsidence, and Casing Damage: A Geomechanics Approach to Mitigation and Reservoir Management," SPE/ISRM 47284, pp. 403-412, Jul. 5-10, 1998.

Lee et al., "Coupled Pressure-Transient Behavior and Geomechanical Deformation in the Near-Borehole Region of Unconsolidated Classic Rock Formations," SPE 102904, pp. 1-10, Sep. 24-27, 2006.

Liu et al., "Coupled Stress and Fluid Flow Using a Finite Element Method in a Commercial Reservoir Simulator," SPE 88616, pp. 1-11, Oct. 18-20, 2004.

Minkoff et al., "Coupled Geomechanics and Flow Simulation for Time-Lapse Seismic Modeling," Geophysics, vol. 69, No. 1, pp. 200-211, Jan.-Feb. 2004.

* cited by examiner

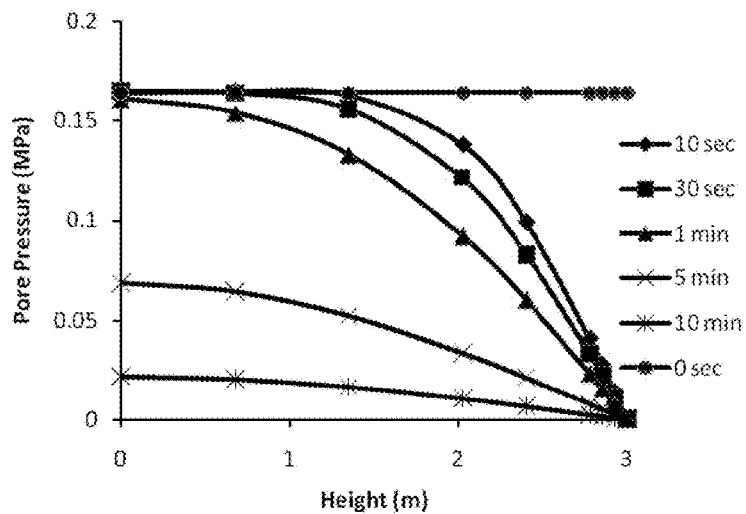
FIG. 5
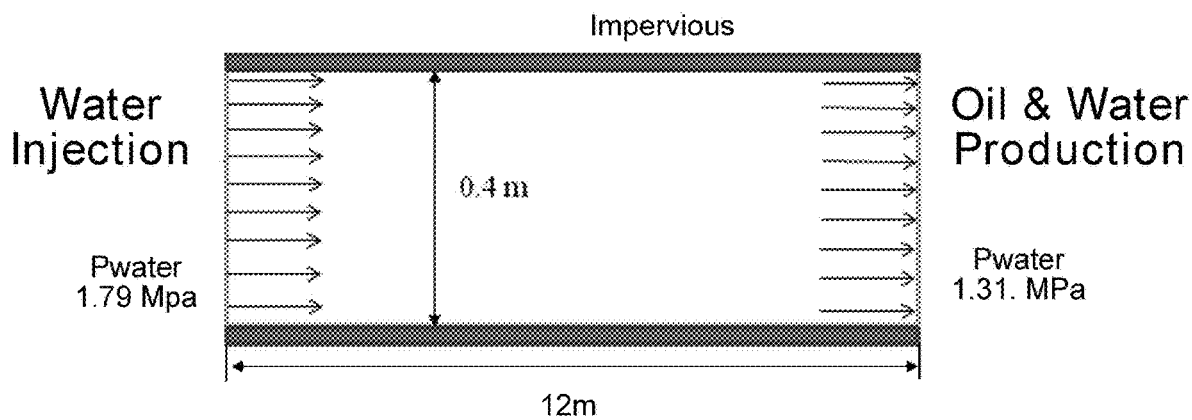
FIG. 6
| Material Properties of rectangular domain | |
|---|---|
| Porosity | 0.15 |
| Viscosity of water | 0.5 cP |
| Viscosity of Oil | 0.5 cP |
| Permeability | 1000 mD |
| Density of Water | 1000 kg/m$^3$ |
| Density of Oil | 880 kg/m$^3$ |
FIG. 7

N-PHASIC FINITE ELEMENT METHOD FOR CALCULATING A FULLY COUPLED RESPONSE OF MULTIPHASE COMPOSITIONAL FLUID FLOW AND A SYSTEM FOR UNCERTAINTY ESTIMATION OF THE CALCULATED RESERVOIR RESPONSE

CROSS REFERENCE TO RELATED APPLICATIONS

This application is a continuation-in-part of, and claims the benefit of the filing date of, U.S. patent application Ser. No. 12/562,939 entitled "N-PHASIC ELEMENT METHOD FOR CALCULATING A FULLY COUPLED RESPONSE OF MULTIPHASE COMPOSITIONAL FLUID FLOW AND A SYSTEM FOR UNCERTAINTY ESTIMATION," filed on Sep. 18, 2009, which claims the benefit of the filing date of U.S. provisional patent application Ser. No. 61/098,123 entitled "N-PHASIC ELEMENT METHOD FOR CALCULATING A FULLY COUPLED RESPONSE OF MULTIPHASE COMPOSITIONAL FLUID FLOW AND A SYSTEM FOR UNCERTAINTY ESTIMATION," filed on Sep. 18, 2008, the disclosures of which are incorporated herein by reference.

BACKGROUND OF THE INVENTION

Field of the Invention

Embodiments of the present invention generally relate to the fields of geology, geophysics, and geomechanics. More particularly, embodiments of the present invention relate to a method for constructing and using a fully coupled model for quantitative characterization of multi-phase fluid flow and heat flow in earth's upper crust for oil and gas reservoir modeling.

Description of the Related Art

The ability to predict a subterranean formation stress state and a deformation path is desirable, especially for a subterranean reservoir zone of interest, in energy related activities, such as oil and gas exploration, or in environmental related activities, such as carbon dioxide sequestration. Known methods for determining these predictions use geophysical measurements, numerical modeling, and real-time monitoring. Such methods have been used to determine an initial subterranean formation geometry, stress state, and deformation history as well as formation properties within a given zone. Changes in the zone induced by drilling, production, and other secondary and tertiary processes, such as fluid injection or environmental remedial activities, are also considered.

The predictions developed using those methods are used to help avoid subterranean formation pathologies including blowout, casing failure, fault reactivation, mud loss, reservoir subsidence beyond tolerance, sand production, seal integrity loss, sequestration failure, and wellbore instability. All of the aforementioned pathologies are related to geomechanical properties of formations, induced stress changes, and the type of in-situ stress regime present in the zone. However, at least one limitation of the current known methods for these predictions is the limited availability of data over limited regions of the zone of interest.

Analytical and numerical models that span several orders of magnitude of temporal and spatial scales are used to determine the flow of fluids in the earth's porous upper crust. The field of geomechanics describes the stress related deformation response of earth formations and is crucial in the known techniques for understanding the effect of fluid flow and stored potential energy dissipation on the alteration of petrophysical properties of oil and gas reservoirs.

Numerical models of reservoirs have traditionally been of the finite difference type due to the fact that finite element method (FEM) is of relatively recent origin (1950's to 60's) and not well developed in the 70s while finite difference method (FDM) had been well established for centuries. However, FEM is a good choice for domains with intricate geometries, due to the difficulty of enforcing grid patterns and boundary conditions in FDM, and for system responses or field solutions with discontinuities. Furthermore, the solution can be modeled with better accuracy and resolution in chosen parts of the domain with FEM thus saving on computational time.

Recent developments in the finite element method such as the multi-grid and multi-scale techniques make FEM a better choice for the current applications even though a regular FEM formulation without incorporating any of the special techniques will work just as well for simple cases. Several very detailed formulations of fully coupled finite element methods are presented in the reference: *The Finite Element Method in the Deformation and Consolidation of Porous Media*, by Lewis R. W., and Schrefler, B. A., John Wiley & Sons, New York, 1987, but these formulations are very unwieldy and not suitable for realistic reservoir simulations which need to be fast for practical applications. Application of statistical techniques to reservoir simulation forms a crucial part of the known methods and variations of established geostatistical procedures are used to assess uncertainties in these solutions to reservoir models.

The techniques known in the art of reservoir simulation, whether based on the finite difference method, the finite element method, or the finite volume method, cannot solve for unsteady, fully coupled compositional flow in nonlinearly deforming rocks with discontinuous solution fields. Also, these techniques do not address the issue of efficient algorithms for coupling elliptic or diffusive (parabolic) pressure equations and the hyperbolic phase saturation equations systems together. Furthermore, due to the wide range of time and space scales, the effect of the fine scale distribution of properties such as permeability is not effectively carried to the coarse scale behavior such as flow.

Most of the solutions proposed in the art use coarse up scaled models with a loose coupling of fluid flow and linear poroelastic solid deformation in a staggered scheme i.e., solve fluid and solid problems separately and sequentially while using the output from one to drive the other. These schemes can only provide acceptable results for layer-cake or jigsaw puzzle type reservoirs of simpler geometries and smooth distribution of properties with mild nonlinearities, and may not provide satisfactory solutions to labyrinth type reservoirs with complex geometries and nonlinear and time-dependent formation behavior.

SUMMARY OF THE DISCLOSURE

Embodiments of the disclosure may provide a method for analyzing subterranean formation. The method may include collecting raw data on the subterranean formation and storing the raw data in an electronic database, generating a coarse scaled rock model from the raw data by electronically processing the raw data, and generating a coarse or fine scale petrophysical and geomechanical property model by electronically processing the scaled rock model. The method may further include generating a multi-grid finite element simulation model of the subterranean formation from the coarse or fine scale petrophysical and geomechanical property model by electronically processing the coarse or fine scale petrophysical and geomechanical property model, and displaying the multi-grid finite element simulation model of the subterranean formation to a user, wherein electronically processing comprises using a microprocessor in communication with a memory containing software instructions configured to generate requested models.

Embodiments of the disclosure may further provide a system for modeling subterranean formations. The system may include a central processing unit, a memory in communication with the central processing unit, a data input device in communication with the central processing unit, and an interface in communication with the central processing unit, the interface being configured communicate with external or remote processors or databases. Additionally, the central processing unit may be configured to execute software instructions stored on the memory, where the software instructions control a method, comprising generating a coarse scaled rock model, generating a coarse or fine scale petrophysical and geomechanical property model, and generating a multi-grid finite element simulation model of the subterranean formation.

Embodiments of the disclosure may further provide a computer program embodied on a computer readable medium, that when executed by a microprocessor, is configured to control a method for modeling a subterranean formation. The method may include receiving and storing raw data representative of a subterranean formation in an electronic database, generating a coarse scaled rock model, a coarse or fine scale petrophysical and geomechanical property model, and a multi-grid finite element simulation model of the subterranean formation, and displaying the multi-grid finite element simulation model of the subterranean formation to a user on a computer display device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 depicts the variation of pore pressure for different time intervals in an illustrative rectangular domain according to an exemplary embodiment of the disclosure.

FIG. 6 depicts an illustrative two dimensional rigid porous domain, according to an exemplary embodiment of the disclosure.

FIG. 7 depicts the material properties of the illustrative domain depicted in FIG. 6.

SUMMARY

Figure 1:
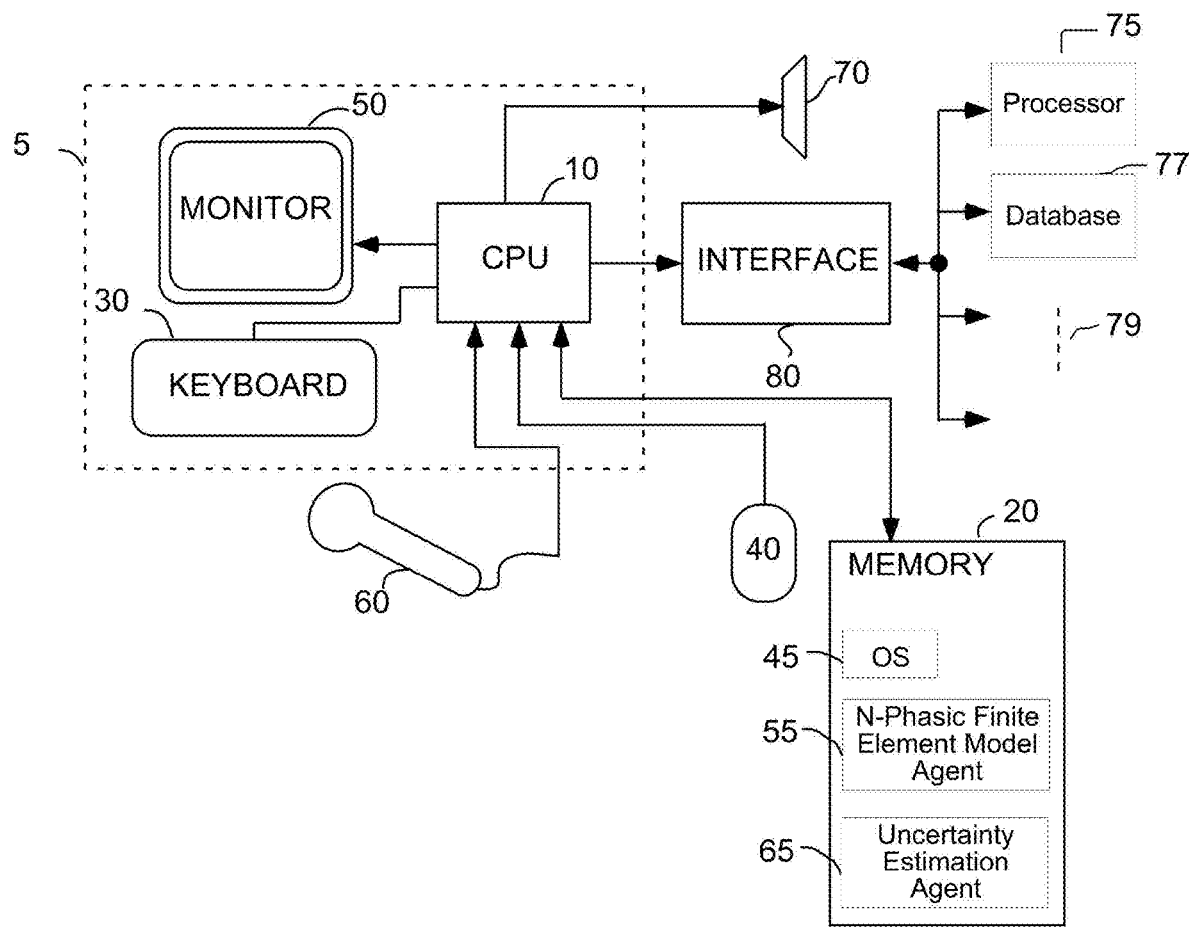
FIG. 1 depicts a representative computer system used to perform N-phasic finite element modeling of a reservoir and/or uncertainty estimation of the calculated reservoir response, according to an exemplary embodiment of the disclosure.

In an exemplary embodiment, a method is disclosed for developing an N-phasic finite element model for performing fully coupled analyses of multi-phase compositional fluid flow and heat flow in nonlinearly deforming porous solid media with time-dependent failure. The method can include the steps of formulating a finite element model of the behavior of a coupled solid-fluid formation, having complex geometry and behavior, and applying the model to simultaneously derive the response of the formation in the form of one or more displacement fields for the solid phases and one or more pressure fields for the fluid phases in a zone of interest in a formation.

In an exemplary embodiment, a system is disclosed for estimating the uncertainties in the derived displacement and pressure field solutions for the response of the fully coupled solid-fluid phases.

DETAILED DESCRIPTION

It is to be understood that the following disclosure describes several exemplary embodiments of the invention, along with exemplary methods for implementing or practicing the invention. Therefore, the following disclosure describes exemplary components, arrangements, and configurations that are intended to simplify the present disclosure. These exemplary embodiments are merely examples of various possible configurations and implementations of the invention and are not intended to be limiting upon the scope of the invention in any way. Further, the present disclosure may repeat reference numerals and/or letters in the various exemplary embodiments and across multiple Figures. Applicants note that this repetition is for the purpose of simplicity and clarity and does not in itself dictate a relationship between the various exemplary embodiments and/or configurations discussed herein.

Additionally, where the following disclosure describes structural relationships between the elements of a particular embodiment, the particular structural relationship described is not intended to be limiting upon the scope of the invention, as the inventors contemplate that various components may be interstitially positioned without departing from the true scope of the invention. Similarly, where a method or sequence is described, unless expressly stated herein, the invention is not intended to be limited to any particular sequence of the method described. Further, the invention is not intended to be limited only to the method or sequence described, as various additional sequences or processed may be implemented in addition to the described method without departing from the true scope of the invention.

Additionally, in various embodiments, the invention may provide advantages over the prior art; however, although embodiments of the invention may achieve advantages over other possible solutions and the prior art, whether a particular advantage is achieved by a given embodiment is not intended in any way to limit the scope of the invention. Thus, the following aspects, features, embodiments, and advantages are intended to be merely illustrative of the invention and are not considered elements or limitations of the appended claims; except where explicitly recited in a claim. Similarly, references to "the invention" herein should neither be construed as a generalization of any inventive subject matter disclosed herein nor considered an element or limitation of the appended claims, except where explicitly recited in a claim.

Further, at least one embodiment of the disclosure may be implemented as a program product for use with a computer system or processor. The program product may define functions of the exemplary embodiments (which may include methods) described herein and can be contained on a variety of computer readable media. Illustrative computer readable media include, without limitation, (i) information permanently stored on non-writable storage media (e.g., read-only memory devices within a computer such as CD-ROM disks readable by a CD-ROM drive); (ii) alterable information stored on writable storage media (e.g., computer disks for use with a disk drive or hard-disk drive, writable CD-ROM disks and DVD disks, zip disks, portable memory devices, and any other device configured to store digital data); and (iii) information conveyed across communications media, (e.g., a computer, telephone, wired network, or wireless network). These embodiments may include information shared over the Internet or other computer networks. Such computer readable media, when carrying computer-readable instructions that perform methods of the invention, may represent embodiments of the present invention.

Further still, in general, software routines or modules that implement embodiments of the invention may be part of an operating system or part of a specific application, component, program, module, object, or sequence of instructions, such as an executable script. Such software routines typically include a plurality of instructions capable of being performed using a computer system or other type or processor configured to execute instructions from a computer readable medium. Also, programs typically include or interface with variables, data structures, etc., that reside in a memory or on storage devices as part of their operation. In addition, various programs described herein may be identified based upon the application for which they are implemented. Those skilled in the art will readily recognize, however, that any particular nomenclature or specific application that follows facilitates a description of the invention and does not limit the invention for use solely with a specific application or nomenclature. Furthermore, the functionality of programs described herein may use a combination of discrete modules or components interacting with one another. Those skilled in the art will recognize, however, that different embodiments may combine or merge such components and modules in a variety of ways.

Further, Applicants note that each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

FIG. 1 depicts a representative computer system used to perform N-phasic finite element modeling of a reservoir and/or uncertainty estimation of the calculated reservoir response according to an exemplary embodiment. A computer 5, which may be any microprocessor based device configured to execute software programs or instructions, can include a central processing unit 10 (CPU), an input device or keyboard 30, and a monitor 50. The computer 5 may generally be configured to run or execute a software package according to an exemplary embodiment described herein. The computer 5 can also include a memory 20 configured to store data and/or software or program information. The computer 5 may also include additional input and output devices, for example a mouse 40, microphone 60, or speaker 70, which can be used for, among other purposes, universal access and voice recognition or commanding. The monitor 50 can be touch-sensitive to operate as an input device as well as a display device.

The computer system 5 can interface with database 77, support computer 75, other databases and/or other processors 79, or the Internet via the interface 80. It should be understood that the term "interface" does not indicate a limitation to interfaces that use only Ethernet connections and refers to all possible external interfaces, wired or wireless. It should also be understood that database 77 and/or processor 75 are not limited to interfacing with computer 5 using network interface 80 and can interface with computer 5 in any manner sufficient to create a communications path between the computer 5 and database 77 and/or processor 75. For example, in an exemplary embodiment, database 77 can interface with computer 5 via a USB interface while processor 75 can interface via another high-speed data bus without using the network interface 80. In another embodiment, the computer 5, processor 75, and other processors 79 can be configured as part of a multi-processor distributed system.

It should be understood that even though the computer system 5 is shown as a platform on which the exemplary methods described can be performed, the methods described can be performed on a number of computer or microprocessor based platforms. For example, the various exemplary embodiments described herein can be used or implemented on any device that has computing/processing capability. For example, the computing capability can include the capability to access any communications bus protocols via the interface 80 such that the user can interact with the many and varied computers 5, processors 75, and/or other databases and processors 79 that can be distributed or otherwise assembled. These devices can include, but are not limited to, and are presented for illustrative purposes only: supercomputers, arrayed server networks, arrayed memory networks, arrayed computer networks, distributed server networks, distributed memory networks, distributed computer networks, desktop personal computers (PCs), tablet PCs, hand held PCs, laptops, devices sold under the trademark names BLACKBERRY® or PALM®, cellular phones, hand held music players, or any other device or system having computing capabilities.

Referring again to FIG. 1, computer programs can be stored in memory 20, and the central processing unit 10 can work in concert with memory 20, input device 30, and output device 50 to perform tasks (as specified by the program being ran or executed at the time) for the user. In an exemplary embodiment, the memory 20 includes any number and combination of memory devices, without limitation, as is currently available or can become available in the art. In an exemplary embodiment, memory devices can include without limitation, and for illustrative purposes only: database 77, other databases 79, hard drives, disk drives, random access memory, read only memory, RAM, SRAM, DRAM, electronically erasable programmable read only memory, flash memory, thumb drive memory, and any other memory device. Those skilled in the art are familiar with the many variations that can be employed using memory devices and no limitations should be imposed on the embodiments herein due to memory device configurations and algorithm prosecution techniques.

The memory 20 can store an operating system (OS) 45, an N-phasic finite element model agent 55, and an uncertainty estimation agent 65. The operating system 45 facilitates control and execution of software using the CPU 10. Any of the available operating systems can be used in this manner including WINDOWS®, LINUX®, Apple OS®, UNIX®, and the like. In at least one exemplary embodiment of the disclosure, the CPU 10 executes the N-phasic finite element model agent 55 when a user requests, among other requests, to perform fully coupled analysis of fluid flow and heat flow in a linear porous solid. In another embodiment of the disclosure, the CPU 10 executes the N-phasic finite element model agent 55 when a user requests, among other requests, to perform fully coupled analysis of multi-phase compositional fluid flow and heat flow in nonlinearly deforming porous solid media with time-dependent failure.

The N-phasic finite element model agent 55 can construct or otherwise generate from predefined algorithms embedded into a software program, a coarse scaled rock model associated with a given formation from raw information sources. The raw information, for example, can come from geological, geophysical, geomechanical, and operations procedures that yield electromagnetic, gravitational, seismic, well log, core, drilling, or production data. The N-phasic finite element agent 55 can use the coarse scale rock model to construct multiple realizations of a coarse scale or fine scale geomechanical and/or petrophysical property model. In an exemplary embodiment, the N-phasic finite element agent 55 can construct or generate one or more multi-grid, multi-level, and/or multi-scale finite element simulation models of at least a portion of the formation by up-scaling one or more fine scale property models. In an exemplary embodiment, the CPU 10 can execute, either from a user request or automatically, the uncertainty estimation agent 65 to estimate the uncertainties in the derived multi-grid finite element simulation models.

Applicants note that the N-phasic finite element agent 55 and the uncertainty estimation agent 65 can be fully autonomous code sets, partially integrated code sets, or fully integrated code sets, and no limitations should be construed from the depiction of the N-phasic finite element agent 55 and the uncertainty estimation agent 65 as separate agents. It should also be noted that it is not necessary to execute the N-phasic finite element agent 55 and the uncertainty estimation agent 65 simultaneously nor is it necessary to execute the two agents on the same computer 5.

Figure 2:
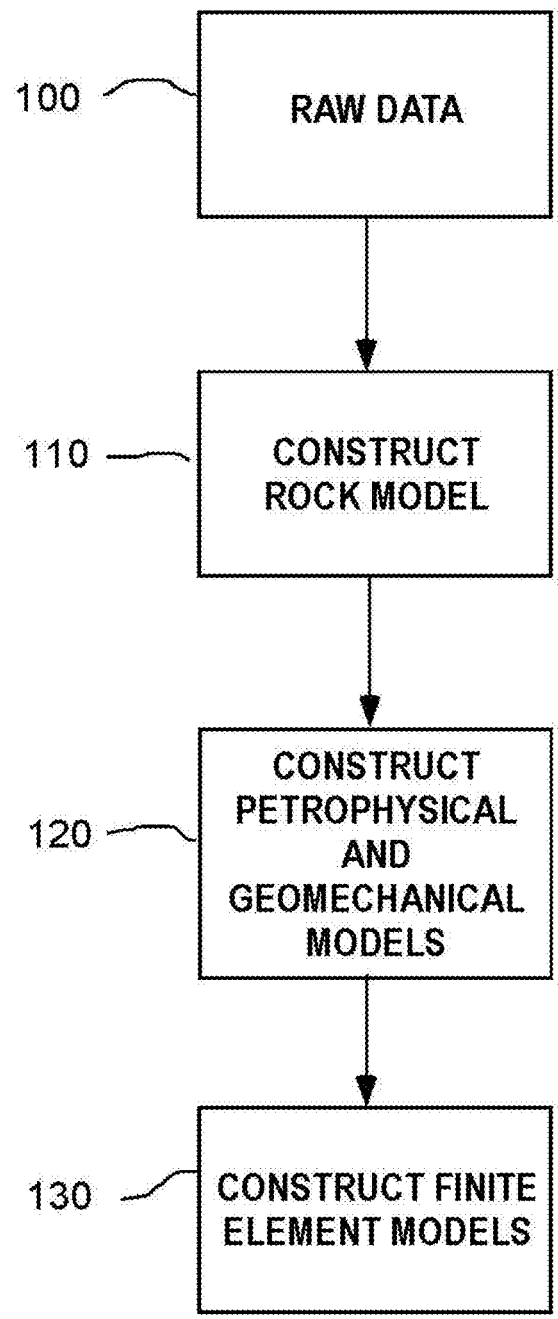
FIG. 2 depicts a representative process flow for developing an N-phasic finite element model for performing fully coupled analysis of multi-phase compositional fluid flow and/or heat flow in nonlinearly deforming porous solid formations with time-dependent failure, according to an exemplary embodiment of the disclosure.

FIG. 2 illustrates an exemplary process flow or methodology for developing an N-phasic finite element model for performing fully coupled analysis of multi-phase compositional fluid flow and/or heat flow in nonlinearly deforming porous solid formations with time-dependent failure. In an exemplary embodiment, raw data 100 can be collected on a formation of interest. Raw data collection may include, for example, geological, geophysical, geomechanical and operations procedures that can yield electromagnetic, gravitational, seismic, well log, core, drilling, or production data. Raw data 100 can be used to generate or construct a coarse scaled rock model 110 by processing the raw data 100 using one or more of the exemplary embodiments described herein.

The rock model 110 can be used to generate or construct one or more coarse and/or one or more fine scale petrophysical and geomechanical property models 120. For example, multiple realizations of a static course or fine scale petrophysical and geomechanical property model 120 can be constructed or generated from the raw data 100 and/or the rock model 110.

From the property models 120, one or more regular, multi-grid, multi-scale, or multi-level finite element simulation models or finite element models 130 can be constructed. For example, a finite element dynamic simulation model 130 of the subterranean formation can be constructed or generated for each realization of the static course or fine scale petrophysical and geomechanical property model 120. The model 130 of the subterranean formation can be in three spatial dimensions and one temporal dimension (i.e., four dimensions). The finite element dynamic simulation models 130 can be constructed or generated by simultaneously calculating statistical bounds of at least one of flow and pressure of. The finite element dynamic simulation models 130 can also be constructed or generated by calculating the statistical bounds of displacement of rock material and any derived quantities thereof.

The finite element models 130 can depict at least a portion of the formation of interest. For example, at least two finite element models 130 can be created by up-scaling the fine scale property models 120 using multi-scale formulations. Also, it is noted here that multiple realizations for the reservoir can be constructed using co-kriging, co-simulation, kriging, or Monte-Carlo techniques as detailed in *Geostatistical Reservoir Modeling*, Deutsch, C. V., Oxford University Press, 2002.

In an exemplary embodiment, several known equations and/or uniquely derived equations can be used in the method or process described above for performing fully coupled analysis of multi-phase compositional fluid flow and/or heat flow in nonlinearly deforming porous solid formations with time-dependent failure. This analysis can be used to describe the fluid flow rates and/or heat flow rates over time through the formation of interest. The analysis can be used to model the nonlinearly deforming porous solid formations as fluid flows through the formation over any time period ranging from seconds to years to decades. In an exemplary embodiment, an equilibrium function can be described by equation (1):

$$\nabla \cdot (\sigma(r) - p(r)I) + f(r) = 0 \quad (1)$$

where, $\sigma$ is the stress tensor of the N-phasic medium (i.e., N=2, single phase fluid flowing in rock; N=3, two phase fluid flowing in rock; and N=4, three phase fluid flowing in rock), I is the unit matrix, f is the body force, p is the average pressure, and r is a given location in the formation.

The average pressure p can be described by equation (2):

$$p(r) = \sum_{i=1}^{3} S_i(r) p_i(r) \quad (2)$$

where, $S_i$, $p_i$ denote the phase saturation and pressure respectively for the three phases at any given location r. The total strain is the sum of the linear elastic and nonlinear plastic or viscoplastic strains and can be determined from the elastic and viscoplastic constitutive relationships, the equations of which can be described by equations (3) and (4):

Elastic constitutive equation=>

$$\sigma = C\varepsilon_L; \varepsilon_L = \frac{1}{2}[\nabla u + (\nabla u)^T] \quad (3)$$

where $\varepsilon_L$ is the elastic strain vector, C is the elastic tensor which can be anisotropic in general and $\sigma$ is the stress.

Viscoplastic flow rule equation=>

$$\partial_t \varepsilon_{NL} = \Gamma \frac{\partial N(\sigma')}{\partial \sigma'}; \Gamma = \frac{1}{x}\{M(\sigma')\} \quad (4)$$

where $\varepsilon_{NL}$ is the viscoplastic strain, $\Gamma$ is the material nonlinearity parameter, X is the relaxation time, $\sigma'$ is the effective stress tensor, $M(\sigma')$ is the yield function and $N(\sigma')$ is the flow potential.

The yield function $M(\sigma')$ can be described by equation (5):

$$M = \left\{ J_2\left[1 + C_1 J_3\left(\frac{1}{J_2}\right)^{1.5}\right]^n + C_2 I_1^2 + C_3 I_1^4 \right\}^{0.5} + C_4 I_1 + C_5 I_1^2 - C_6 \quad (5)$$

The flow potential function $N(\sigma')$ can be described by equation (6):

$$N = (C_7 J_2 + C_2 I_1^2 + C_3 I_1^4)^{0.5} + C_8 I_1 + C_5 I_1^2 \quad (6)$$

where $C_1$, $C_2$, $C_3$, $C_4$, $C_5$, $C_6$, $C_7$, $C_8$ and n are typically in the range of from about 1.0 to about 2.0, from about 0.003 to about 0.007, from about $1\times10^{-8}$ m$^2$/kN to about $2\times10^{-8}$ m$^2$/kN, from about 0.1 to about 0.3, from about $3\times10^{-6}$ m$^2$/kN to about $7\times10^{-6}$ m$^2$/kN, from about 5 to about 50 kN/m$^2$, from about 0.5 to about 1.5, from about 0.05 to about 0.3, and from about 0.4 to about 0.7 respectively for specific rock types in different regions of the world.

The parameters $I_1$, $J_2$, $J_3$ are respectively the standard first stress invariant and the second and third principal deviatoric stress invariants calculated from the effective stress tensor. The phase conservation and component conservation for the formation of interest can be described by equations (7) and (8):

Phase conservation (water: i=1, oil: i=2, gas: i=3)=>

$$\partial_t\left(\sum_{i=1}^{3} \phi S_i \rho_i\right) + \nabla \cdot (\rho_i u^i) = \sum_{i=1}^{3} q_i^P \delta(r - r_0^P) + \sum_{i=1}^{3} q_i^R \delta(r - r_0^R) \quad (7)$$

Component conservation (CH$_4$: j=1, C$_2$H$_6$: j=2, etc)=>

$$\partial_t\left(\sum_{i=1}^{3} \phi S_i \rho_i C_{ij}\right) + \nabla \cdot \left(\sum_{i=1}^{3} \rho_i C_{ij} u^i\right) = \nabla \cdot \left(\sum_{i=1}^{3} \phi S_i \rho_i D_{ij} \nabla C_{ij}(r)\right) + \sum_{i=1}^{3} q_i^P \alpha_{ij} \delta(r - r_0^P) + \sum_{i=1}^{3} q_i^R \beta_{ij} \delta(r - r_0^R) \quad (8)$$

where in equations (7) and (8), $\phi$ is the porosity; $\rho_i$ is the phase density; $C_{ij}$ is the mass fraction of component j in phase i; $u^i$ is the velocity vector of phase i; $D_{ij}$ is the macroscopic molecular diffusion tensor; $\alpha_{ij}$, $\beta_{ij}$ are the mass fractions of component j in phase produced and injected respectively; $q_i^P$, $q_i^R$ are the production and injection mass flow rates of phase i; and, $r_0^P$, $r_0^R$ are the location vectors of the production and injection locations.

The momentum conservation for the formation of interest can be described by equation (9):

$$q^i = -K(r, \varepsilon) \frac{k(r)_{ri}}{\mu(r)_i} (\nabla p_i(r) - \rho_i(r) g \nabla Z(r)) \quad (9)$$

where $q^i$ is the mass flow rate vector of phase i; K is the permeability tensor which can be anisotropic in general; $k_{ri}$ is the relative permeability of phase i; $\mu_i$ is the viscosity of phase i; g is the gravitational acceleration; and Z is a potential metric. It should be noted here that the permeability K and the porosity $\phi$ values can be dependent on the total strain $\varepsilon$ (or reservoir deformation gradient) values from the previous time step.

The energy conservation for the formation of interest can be described by equation (10):

$$\partial_t\left[(1-\phi)\rho_r h_r + \sum_{i=1}^{3} \phi S_i \rho_i h_i\right] + \nabla \cdot \left(\sum_{i=1}^{3} \rho_i h_i u^i\right) = \nabla \cdot (k_e \nabla T(r)) + \partial_t Q \quad (10)$$

where in equation (10), $\rho_r$ is the rock density; $h_r$ is the specific enthalpy of rock; $h_i$ is the specific enthalpy of fluid phase i; $k_e$ is the effective thermal conductivity of the rock/fluid mass; T(r) is the temperature field; and $\partial_t Q$ is the heat source flow rate. The total saturation constraint for each phase, Total mass fraction constraints for components in each phase, Liquid phase PVT equations for phase density and viscosity, Relative permeability, Phase Equilibria and Capillary Pressure for the formation of interest can be described by equations (11) through (18):

Total saturation constraint for each phase=>

$$\sum_{i=1}^{3} S_i = 1 \quad (11)$$

Total mass fraction constraints for components in each phase=>

$$\sum_{j=1}^{N} C_{1j} = 1 \quad (12a)$$

$$\sum_{j=1}^{N} C_{2j} = 1 \quad (12b)$$

-continued $$\sum_{j=1}^{N} C_{3j} = 1 \quad (12c)$$

Liquid phase PVT equations for phase density and viscosity are derived from experiments=>

$$\rho_i = \rho(p_i, C_{ij}(j=1 \ldots N)) \quad (13)$$

$$\mu_i = \mu(p_i, C_{ij}(j=1 \ldots N)) \quad (14)$$

Relative permeability equations=>

$$k_{ri} = k_{ri}(S_1, S_2, S_3) \quad (15)$$

where in equation (15) the functions, $k_{ri}(S_1, S_2, S_3)$ are given as:

$$k_{rw} = (S'_w)^\beta [1-(S''_w)^\delta]^\gamma \quad (16)$$

$$k_{ro} = (S'_o)^\beta [1-(S''_o)^\delta]^\gamma \quad (17)$$

$$k_{rg} = (1-S'_w-S'_o)^\lambda [(S''_w+S''_o)]^\mu \quad (18)$$

where $$S'_w = \frac{S_w - S^r_w}{1 - S^r_w - S^r_g}, \text{ and, } S'_o = \frac{S_o - S^r_o}{1 - S^r_o - S^r_g} \quad (19)$$

$$S''_i = 1 - (S'_i)^{\frac{1}{\gamma}}, \text{ for } i = 1, 2, 3; \text{ water, oil, gas} \quad (20)$$

where in equation (19) superscripts "r" denote residual saturations. Typical values for exponents, $\beta$, $\delta$, $\gamma$, $\lambda$, $\mu$, can be in the range of from about 0.2 to about 0.7, from about 1 to about 2, from about 1 to about 3, from about 0.1 to about 0.5, and from about 1 to about 5 respectively.

Phase Equilibria Equations=>

$$\frac{C_{1j}(T(r), p(r))}{C_{2j}(T(r), p(r))} = K_{j12} \quad (21a)$$

$$\frac{C_{2j}(T(r), p(r))}{C_{3j}(T(r), p(r))} = K_{j23} \quad (21b)$$

$$\frac{C_{1j}(T(r), p(r))}{C_{3j}(T(r), p(r))} = K_{j13} \quad (21c)$$

Capillary Pressure Equations=>

$$P_{c-ow} = p_o - p_w = p_{cow}(S_1, S_2, S_3) \quad (22)$$

$$P_{c-go} = p_g - p_o = p_{cgo}(S_1, S_2, S_3) \quad (23)$$

where in equations (22) and (23) the functions $P_{cow}(S_1, S_2, S_3)$, $P_{cgo}(S_1, S_2, S_3)$ are standard empirical functions that can be derived from laboratory data for drainage and imbibition conditions.

The equations of a coupled multiphase flow and rock deformation can be given by equations (1) through (23). The equations (1) through (23) can be formulated into one or more finite element models in terms of a combination of the unknown response fields, for example, rock phase displacements, fluid phase velocities, fluid phase pressures, and reservoir temperature.

The one or more finite element models can be used to solve for the response of the formation of interest to fluid flow through the formation. For example, during recovery of hydrocarbons from a formation of interest, water can be injected to push the hydrocarbons towards a well. While the fluid flows through the formations that make up the reservoir that contains the hydrocarbons, the formation pressures can change and the surrounding rocks can move. Using an exemplary embodiment described herein, the response of the formation of interest to the fluid flow associated with the hydrocarbon production can be estimated.

In an exemplary embodiment, the governing equations of the coupled multiphase flow and rock deformation can be given by equations (1) to (23). There can be (21+3p) unknowns, where p is the number of components (methane, ethane etc.) in each phase. The unknowns can include at least the three components of rock displacement vector u, nonlinear strain $\varepsilon_{NL}$, nonlinear material parameter $\Gamma$, temperature T, three pressures $p_i$ (related to fluid velocities $v^i$ obtained from flow rates $q^i$ in equation (9), three saturations $S_i$, three densities $\rho_i$, three viscosities $\mu_i$, three permeabilities $k_{ri}$ and 3p component concentrations.

For example, there can be (21+3p) total equations to solve including three from equation (1), two from equation (4), p from equation (8), one each from equations (10) and (11) respectively, three each from equations (12), (13), (14), and (15) respectively, 2p from equation (21), and one each from equations (22) and (23).

A transient problem can be formulated from equations (1) to (23) and suitable boundary and initial conditions can also be prescribed as follows.

$$p(t) = p_0 \text{ on } \partial\Omega_p \quad (24)$$

$$q(t) = q_0 \text{ on } \partial\Omega_f \quad (25)$$

$$u(t) = u_D \text{ on } \partial\Omega_o \quad (26)$$

$$\sigma \cdot n = t_N \text{ on } \partial\Omega_t \quad (27)$$

$$u(0) = u_0 \quad (28)$$

$$p(0) = p_0 \quad (29)$$

In equations (25) through (29), $\partial\Omega_p$, $\partial\Omega_f$, $\partial\Omega_o$, $\partial\Omega_t$ can represent the surface boundary having pressure, fluid flux, displacement and traction specified respectively, and $u_0$, $p_0$, can be initial values of displacement and pressure. In an exemplary embodiment, a time-dependent transient coupled finite element model can be formulated as outlined in *The Finite Element Method Its Basis & Fundamentals*, Zienkiewicz, O. C., Taylor, R. L., 6th Edition, Elsevier Butterworth-Heinemann, Oxford, section 18.3.3, pp. 648-649, 2005 and *The Finite Element Method for Solid and Structural Mechanics*, Zienkiewicz, O. C., and Taylor, R. L., 6th Edition, Elsevier Butterworth-Heinemann, Oxford, section 2.4, pp. 24-28 and chapter 3, pp. 46-61, 2005.

For a single component three phase flow within a linear rock, the problem can be formulated in terms of a combination of the unknown response fields, namely, rock phase displacements, u, fluid phase pressures p, and reservoir temperature T and reduced to a form similar to equation (18.75) found in the reference *The Finite Element Method Its Basis & Fundamentals*, Zienkiewicz, O. C., Taylor, R. L., 6th Edition, Elsevier Butterworth-Heinemann, Oxford, 2005, p. 648, having similar matrix terms:

$$\begin{bmatrix} C & L_F & L_T \\ C_F & S_F & S_T \\ C_T & T_F & T_S \end{bmatrix} \frac{\partial}{\partial t} \begin{Bmatrix} u \\ p \\ T \end{Bmatrix} + \begin{bmatrix} K & Q_F & Q_T \\ O & H_P & O \\ O & O & H_T \end{bmatrix} \begin{Bmatrix} u \\ p \\ T \end{Bmatrix} = \begin{Bmatrix} f_1 \\ f_2 \\ f_3 \end{Bmatrix} \quad (30)$$

Equation (30) yields a simultaneous solution for formation response in the form of rock phase displacement field (u), fluid phase pressure field (p), and formation temperature field (T) for each realization of the formation system. The uncertainty of the formation response can be estimated by deriving statistical bounds or metrics of the distribution of responses of all realizations.

Those skilled in the art will readily deduce these matrices from terms found in the reference *The Finite Element Method Its Basis & Fundamentals*, Zienkiewicz, O. C., Taylor, R. L., 6$^{th}$ Edition, Elsevier Butterworth-Heinemann, Oxford, 2005, p. 648 and the equations given in *A finite element porothermoelastic model for dual-porosity media*, Nair, R. et al, *International Journal for Numerical and Analytical Methods in Geomechanics*, 28, pp. 875-898, 2004.

For a single component three phase flow within a nonlinear rock, a finite element formulation can be constructed of the form:

$$\begin{bmatrix} C_{NL} & 0 \\ 0 & R_{NL} \end{bmatrix} \frac{\partial}{\partial t} \begin{Bmatrix} x \\ y \end{Bmatrix} + \begin{Bmatrix} K_{NL}(x, y) \\ Z_{NL}(x, y) \end{Bmatrix} = \begin{Bmatrix} F_1 \\ F_2 \end{Bmatrix} \qquad (31)$$

In equation (31), $C_{NL}$, $R_{NL}$, $K_{NL}$, $Z_{NL}$, $F_i$ are finite element model matrices and vectors. $C_{NL}$, $K_{NL}$ and $F_1$ can be derived from applying the Gauss integral theorem to the variational statements of equations (1), (7), and (10) with the use of equation (9) and interpolating the field variables by shape functions and nodal unknowns. In an exemplary embodiment, methods described in *The Finite Element Method for Solid and Structural Mechanics*, Zienkiewicz, O. C., and Taylor, R. L., 6$^{th}$ Edition, Elsevier Butterworth-Heinemann, Oxford, 2005 can be used. $R_{NL}$, $Z_{NL}$ and $F_2$ can be derived from equations (4), (5) and (6) for example, by using methods found in *The Finite Element Method for Solid and Structural Mechanics*, Zienkiewicz, O. C., and Taylor, R. L., 6$^{th}$ Edition, Elsevier Butterworth-Heinemann, Oxford, pp. 102-104, 2005. The vectors X, y can be unknowns of the model described by equation 31. Here, X can be a vector of unknown rock displacements u, fluid pressures p, and reservoir temperatures T. The variable y can be a vector of unknown reservoir nonlinear (viscoplastic) strain $\varepsilon_{NL}$ and nonlinear material parameter $\Gamma$.

An extension of equation (31) to multi-component cases is only a matter of book-keeping and can be completed by those skilled in the art.

The matrix equations can be solved by standard methods on single processor and/or multiprocessor systems. In an exemplary embodiment, performing fully coupled analysis of multi-phase compositional fluid flow and/or heat flow in nonlinearly deforming porous solid formations with time-dependent failure can be achieved using equations (1) through (23) and an exemplary embodiment of the computer system 5 described in FIG. 1 above. In an exemplary embodiment, performing fully coupled analysis of multi-phase compositional fluid flow and/or heat flow in nonlinearly deforming porous solid formations with time-dependent failure can be achieved using equations (1) through (31) and an exemplary embodiment of the computer system 5 described in FIG. 1 above.

Figure 3:
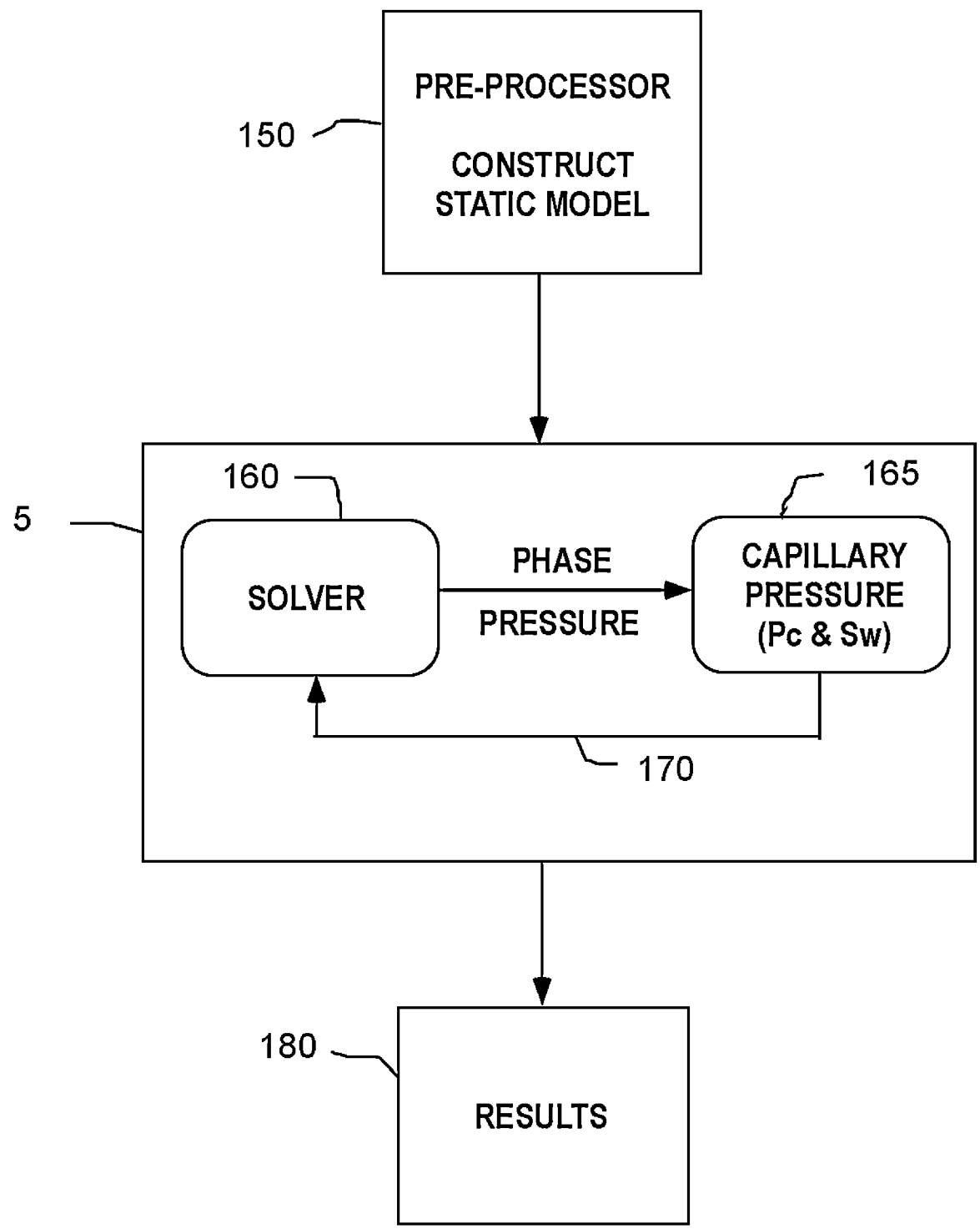
FIG. 3 depicts a representative process flow for developing an N-phasic finite element model, according to an exemplary embodiment of the disclosure.

FIG. 3 depicts a representative method or process flow for developing an N-phasic finite element model according to an exemplary embodiment. In an exemplary embodiment, pre-processing can be performed, using techniques known in the art, to construct a static model 150 of at least a portion of the formation of interest. The N-phasic finite element model can represent a single-phase fluid (oil, water or gas), or a single-phase solid, as limiting cases of an N-phasic material at a single point eliminating separate domains for fluids and for solid in the numerical model. The method uses a theory of mixtures commencing with deformation relationships and balance laws with specific assumptions for compositional flow of oil, water, and gas in porous rock media incorporated and constitutive relations based on thermodynamic principles. This approach increases the computational efficiency compared to regular finite element models.

A solver 160, such as that described in the reference *A Scalable Multi-level Preconditioner for Matrix-Free m-Finite Element Analysis of Human Bone Structures by Peter Arbenz et al International Journal for Numerical Methods in Engineering*, Volume 73 Issue 7, Pages 927-947, 2007, can be used to iteratively solve 170 for unknowns using the computer 5. For example, a parallelized preconditioner, such as the algebraic multigrid or another type together with a matrix-free representation may be used to save memory and reduce computational time drastically. For blocky three-dimensional reservoir geomechanics problems considered herein, the solution time for matrix-free nonlinear slover can be proportional to the cube root of the number of degrees of freedom times the number of degrees of freedom. For example, unknowns can include Capillary Pressure (Pc) and Water Saturation (Sw) 165. The results can be output 180 in any known format for one or more known purposes or for use in uncertainty estimations as described below with reference to FIG. 4.

In an exemplary embodiment, constructing a static model 150 can be performed using known methods or by using an exemplary embodiment described above with reference to FIG. 2. For example, using known techniques, equations (1) through (23) can be used to construct a static model of at least a portion of a formation of interest.

Referring again to FIG. 3, constructing a static model 150 can start with the pre-processing of data. For example, input data such as formation geometry, can be used to construct a finite element mesh, material properties can be used to construct a constitutive model, and initial conditions can be used as a starting point in estimating a potential reservoir's production conditions. Constructing a static model 150 can include constructing a regional geological macro-model (of the order of hundreds to thousands of meters) that may include several fields and reservoirs within. The static model construction 150 can include generating a very coarse scale geological-petrophysical meso-model (of the order of tens to hundreds of meters) for the reservoir and immediate surrounding zone under consideration.

The construction of the static model 150 can include a coarse scale reservoir meso-model (of the order of meters to hundreds of meters) that defines reservoir features such as faults and salt intrusions from structural, stratigraphic, facies, petrophysical, and geomechanical information from available seismic, well log, core, drilling and production data. The static model construction 150 can include several fine scale micro-models (of the order of fractions of meters to meters) that can define features such as wells and enmesh within the meso-models. The static model construction 150 can include using one or more of the macro, meso, and micro-models to construct a static model consisting of, for example, reservoir units.

In an exemplary embodiment, the computer 5 can include a solver 160 as part of the N-phasic finite element agent 55 with reference to FIG. 1 above. The solver 160 can be programmed using the finite element formulation given by equation (31) with reference to FIG. 2 above. Returning to FIG. 3, the static model 150 can be used as an input to the solver 160. The solver 160 can solve for unknowns such as Pc and Sw. After solving for the initial unknowns, another iteration 170 can be run using the solver 160 to generate another set of results. The results can be compared to the initial run results and then iterated again until the results from the individual runs converge to an acceptable and reproducible result.

Figure 4:
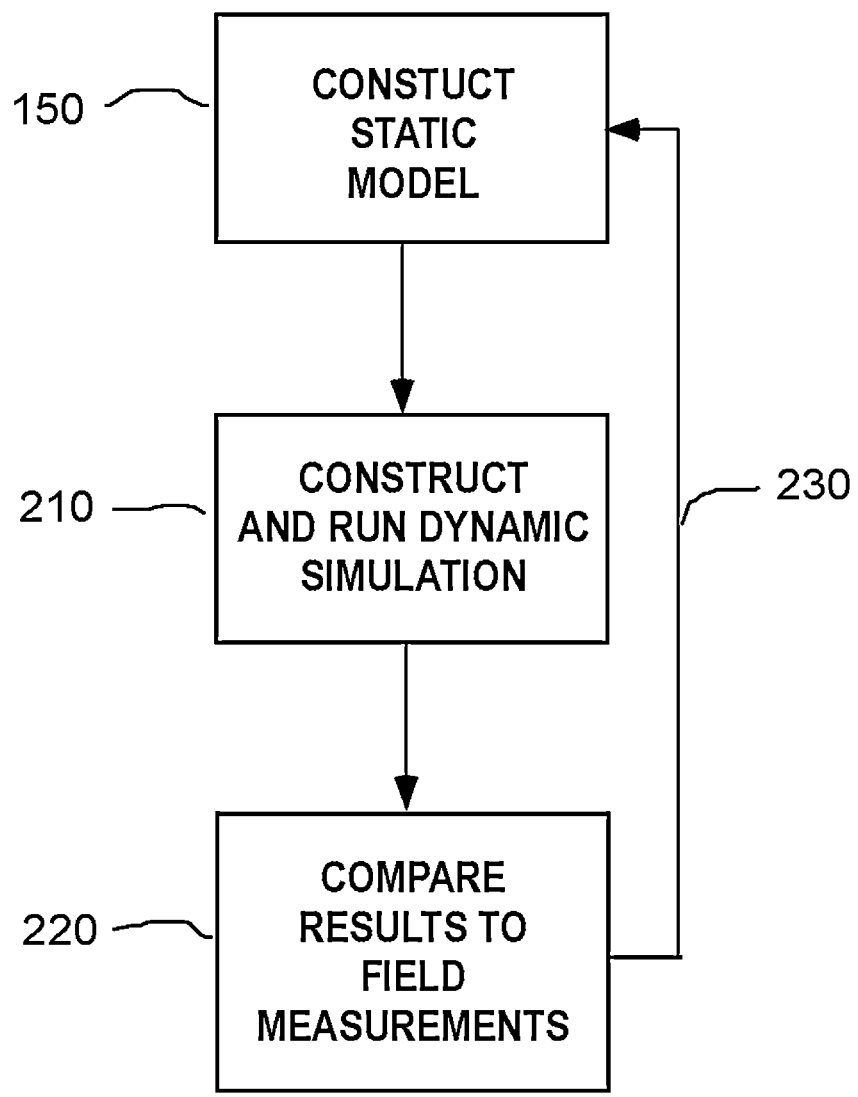
FIG. 4 depicts a representative process flow for estimating the statistical uncertainties in the derived field solutions for the formation response of the fully coupled solid-fluid phase formation, according to an exemplary embodiment of the disclosure.

FIG. 4 depicts a representative method or process flow for estimating the statistical uncertainties in the derived field solutions for the formation response of the fully coupled solid-fluid phase formation. In an exemplary embodiment, a static model can be built 150, a dynamic simulation model can be constructed and run 210 using an exemplary embodiment described herein, and the dynamic simulation model results can be compared to field measurements 220 and then iteratively run 230 to calibrate the dynamic simulation model. In at least one embodiment, the dynamic simulation model can be a finite element dynamic simulation model. Constructing a static model 150 can include constructing a regional geological macro-model (of the order of hundreds to thousands of meters) that may include several fields and reservoirs within.

The static model construction 150 can include generating a very coarse scale geological-petrophysical meso-model (of the order of tens to hundreds of meters) for the reservoir and immediate surrounding zone under consideration. The static model construction 150 can include a coarse scale reservoir meso-model (of the order of meters to hundreds of meters) that defines reservoir features such as faults and salt intrusions from structural, stratigraphic, facies, petrophysical and geomechanical information from available seismic, well log, core, drilling and production data. The static model construction 150 can include several fine scale micro-models (of the order of fractions of meters to meters) that can define features such as wells and enmesh within the meso-models. The static model construction 150 can include using one or more of the macro, meso, and micro-models to construct a static model consisting of, for example, reservoir units. A dynamic model consisting of flow units; and structured or unstructured finite element mesh or geometrical model can be constructed.

In an exemplary embodiment, constructing and running a dynamic simulation can include finite element dynamic simulations on multiple realizations of the static models obtained using, for example, the co-kriging, co-simulation, kriging, or Monte-Carlo techniques; and time marching alteration of reservoir permeabilities and porosities based on geomechanical strains and statistical analyses of the results. For example, this will yield probability distributions, such as Probability Density Functions ("PDF") or Cumulative Density Functions ("CDF"), of certain parameters such as displacement and stress fields in the formation solid phase, a pressure field in the formation fluid phase, production rates, gas-oil ratio (GOR), watercut rates and reservoir subsidence. In an exemplary embodiment, the dynamic simulation can be based on the finite element formulation given by equation (31) with reference to FIG. 2 above.

Returning to FIG. 4, in an exemplary embodiment, calibrating the finite element dynamic simulation model can be performed by comparing the results from the simulation to field measurements 220. Parameters of the finite element dynamic simulation model can then be adjusted based upon the comparison to reduce an error vector. Calibrating the dynamic simulation can include calibration of the petrophysical model from history matching to existing production data; calibration of the petrophysical model to 4-D seismic measurements; calibration of the geomechanical model to data from wellbore stability analysis; and calibration of the geomechanical model to reservoir deformation measurements from techniques such as tiltmeters and/or satellite imagery. After comparing the results to the field measurements, another iteration 230 can be performed by making adjustments to the static model 150 so that it better approximates the actual field conditions, the dynamic model can be updated using the new static model and run, then the results can be compared to field measurements again, and so on until the results converge.

In an exemplary embodiment, all known and practiced variations of the two dimensional and three dimensional finite element formulations based on any of Lagrangian-Eulerian, Updated Lagrangian, Total Lagrangian methods with variations in material configurations such as Biphasic, Triphasic, Quadriphasic, Poroelastic can be used.

In an exemplary embodiment, the formulated finite element model can be solved by any of the standard methods for hyperbolic systems including, but not limited to, streamline methods, upwind schemes and method of characteristics such as those detailed in the reference *The Finite Element Method for Fluid Mechanics*, Zienkiewicz, O. C., and Taylor, R. L., 6$^{th}$ Edition, Elsevier Butterworth-Heinemann, Oxford, pp. 79-109, 2005.

In an exemplary embodiment, finite element meshes can be structured or unstructured meshes generated by the *Vornoi tessellations*; or the techniques for quadrilateral (2D) or hexahedral (3D) meshing such as Mapped, *Unstructured Quad, Unstructured, Hex-Dominant Methods*; or the techniques for triangle (2D) and/or tetrahedral (3D) mesh generation algorithms such as *Octree, Delaunay, Point insertion, Boundary Constrained Delaunay Triangulation, the advancing front* (also known as moving front method).

In an exemplary embodiment, time and space discretization adaptive refinement schemes, known in the art can be employed. Further, in an exemplary embodiment, the finite element model can be imposed on multi-level, multi-grid, or full multi-grid geometries know in the art. For example, finite element model techniques described in the reference *A Massively Parallel Multi-grid Method for Finite Elements*, Benjamin Bergen, Tobias Gradl, Frank Hülsemann, Ulrich Rüde, *Computing in Science and Engineering*, vol. 8, no. 6, pp. 56-62, November/December, 2006 can be used.

As in any efficient multi-grid implementation, the full multi-grid method can be used. For example, the full multi-grid method can include solving the problem on coarse grids, and using these solutions as initial approximations for the next finer level. This process can continue until it reaches the finest level desired.

In an exemplary embodiment, solution techniques applied to the final discretized system of matrix equations can be used. For example, methods including conjugate gradient and variations, MINRES—the minimal residual method and/or GMRES—the generalized minimal residual can be used.

Prophetic Example

The foregoing discussion can be further described with reference to the following non-limiting prophetic example. For simplicity and ease of description, only some of the calculations performed using the method and system are presented here.

In this prophetic example, a two dimensional porous sample is considered in the numerical analysis of the porous medium using the finite element method. A uniformly distributed pressure of 4.0 MPa is given at the top layer of the domain with the vertical displacement of the bottom region constrained to zero. The left and right sides of the domain are constrained in the axial direction. Both drained and undrained conditions are simulated in this work. In the undrained simulation the top surface of the model is made impermeable to any flow. In the drained condition the loading is kept constant while the top surface of the model is made permeable to fluid flow. It is of interest to analyze the pressure changes with time and with depth in the domain.

FIG. 5 depicts the variation of the pore pressure for different time intervals in an illustrative rectangular domain. As seen from the figure, at steady state the pressure is 1.64 MPa and the pressure decreases as time increases. When time reaches infinity, the pore pressure goes to zero. The results presented here are compared with analytical solutions and are found to be within acceptable range.

FIG. 6 depicts an illustrative two dimensional rigid porous domain. The domain is filled with two phase fluid consisting of oil and water at prescribed conditions of saturation and pressure. The fluids and the rock are incompressible and no mass transfer between the phases is considered. The domain is surrounded by impermeable domain at the upper and lower regions. In this work, oil and water extraction is carried out at the right end of the domain by injecting water at an inlet pressure on the left side of the domain. The fluid displaces the oil from the injection region side of the domain to the extraction region. The initial conditions and boundary conditions can be described by equation (32) and (33) respectively:

$$S_w^0, p_w^0 \; t=0 \text{ in } \Omega \qquad (32)$$

$$x=0,12.0 \; m \; S_w, p_w$$

$$y=0,0.4 \; m \; q.n=0 \text{ for } t>0 \qquad (33)$$

An initial water pressure of 4.0 MPa is defined for the entire domain and oil pressure is obtained using capillary pressure saturation relationships for water saturation of 0.15. This case is applied with the specified pressure at the inlet and exit regions of the system. The pressure of oil at the inlet and exit of the rectangular domain is obtained from the capillary pressure-saturation curve of the oil water system. FIG. 7 depicts the material properties of the illustrative domain.

Figure 8:
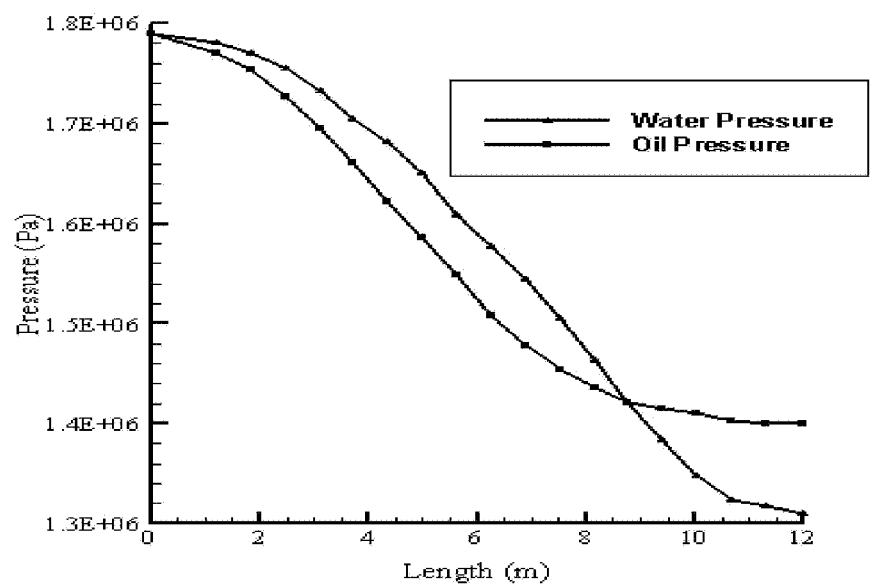
FIG. 8 depicts pore pressure distribution for oil and water phase in the illustrative domain of FIG. 6, according to an exemplary embodiment of the disclosure.
Figure 9:
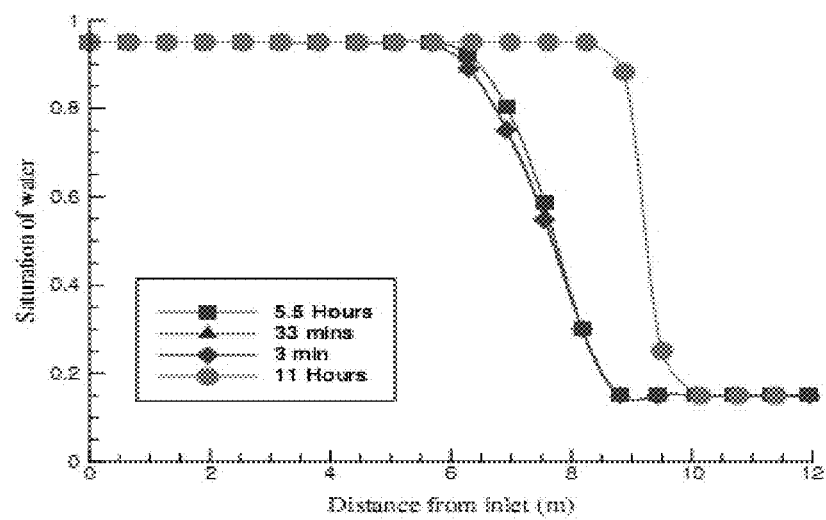
FIG. 9 depicts a saturation profile for different time intervals of the illustrative domain of FIG. 6, according to an exemplary embodiment of the disclosure.

The entire domain was meshed using four noded quadrilateral elements having two degrees of freedom per node. The analysis was carried out for time intervals of 200 seconds, 33 minutes, 5 hours, and 11 hours and the corresponding distribution of oil and water pressure and saturation profile is obtained from the analysis. FIG. 8 depicts the pore pressure distribution for oil and water phase in the illustrative domain after 11 hours. FIG. 9 depicts the saturation profile for the different time intervals. From the figures, it is evident that as time increases the injected fluid flows across the domain and would reach the extraction region leading to "breakthrough". The finite element model developed in this work is capable of analyzing the effects of inlet and outlet pressures, relative permeability relationship on the movement of the injected fluid front and oil and water extraction.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method for modeling a subterranean formation and deriving a response in a zone of interest in the subterranean formation based on the modeling, the method comprising:
    collecting, by a processor, raw data on the subterranean formation, wherein the raw data comprises data associated with a formation geometry of the subterranean formation;
    storing, by the processor, the raw data in an electronic database;
    executing, by the processor, a set of instructions to model the subterranean formation and derive the response in the zone of interest in the subterranean formation, wherein executing the set of instructions includes:
        constructing, by the processor, a multi-scale or multi-grid finite element mesh from the formation geometry;
        generating, by the processor, multiple realizations of a static coarse or fine scale petrophysical and geomechanical property model based on, the multi-scale or multi-grid finite element mesh;
        generating a multi-scale or multi-grid finite element dynamic simulation model of the subterranean formation for each realization of the static coarse or fine scale petrophysical and geomechanical property model; and
        deriving, by the processor, the response in the zone of interest in the subterranean formation from at least one realization of the multi-scale or multi-grid finite element dynamic simulation model, wherein the response is derived in the form of one or more displacement fields for solid phases and one or more pressure fields for fluid phases in the zone of interest in the subterranean formation; and
    applying, by the processor, information representative of the response in the zone of interest in the subterranean formation to model the subterranean formation.

2. The method of claim 1, wherein the raw data includes geological, geophysical, geomechanical, electromagnetic, gravitational, seismic, well log, core, drilling, or production data.

3. The method of claim 1, wherein the multi-scale or multi-grid finite element dynamic simulation model of the subterranean formation comprises displaying an N-phasic finite element model.

4. The method of claim 3, wherein the displayed N-phasic finite element model represents a filly coupled analysis of multi-phase compositional fluid flow and heat flow in non-linearly deforming porous solid media with time-dependent failure.

5. The method of claim 1, further comprising: using material property raw data to generate a constitutive model; and using initial and boundary conditions as a starting point to generate a potential reservoir production condition.

6. The method of claim 1, further comprising generating a geological-petrophysical meso-model of the subterranean formation and immediate surrounding zone.

7. The method of claim 1, further comprising generating each realization of the static coarse or fine scale petrophysical and geomechanical property model by using at least one of a co-kriging technique, a co-simulation technique, a kriging technique, a Monte-Carlo technique, and a time-marching alteration of reservoir permeability and reservoir porosity.

8. The method of claim 1, wherein the finite element dynamic simulation model of the subterranean formation yields a probability distribution of at least one of a displacement and stress field in the formation solid phase, a pressure field in formation fluid phase, a ratio of oil to gas, a watercut rate, and reservoir subsidence.

9. The method of claim 1, wherein each realization of the multi-scale or multi-grid finite element dynamic simulation model is generated by simultaneously calculating statistical bounds of at least one of flow and pressure of formation fluids and calculating statistical bounds of displacement of rock material and any derived quantities thereof.

10. The method of claim 1, further comprising calibrating each realization of the multi-scale or multi-grid finite element dynamic simulation model by comparing results from the multi-scale or multi-grid finite element dynamic simulation mode field measurements and adjusting parameters of the multi-scale or multi-grid finite element dynamic simulation model to reduce an error or therebetween.

11. The method of claim 10, wherein the error vector is derived from at least one of history matching to existing production data, four dimensional seismic measurements, wellbore stability analysis, and reservoir deformation measurements.

12. The method of claim 1, in the multi-scale or multi-grid finite element dynamic simulation model yields a simultaneous solution for deriving the response with respect to at least two fields selected from the group consisting of: a rock phase displacement field, a fluid phase pressure field, and a formation temperature field.

13. A system for modeling subterranean formations and deriving responses in zones of interest in the subterranean formations based on the modeling, the system comprising:
a display device;
central processing unit;
a memory in communication with the central processing unit;
a data input device in communication with the central processing unit; and
an interface in communication with the central processing unit, wherein the interface is configured to communicate with external or remote processors or databases, wherein the central processing unit is configured to execute software instructions stored on the memory, and wherein the software instructions, when executed by the central processing unit, cause the central processing unit to control operations for modeling a subterranean formation in three spatial dimensions and one temporal dimension and for deriving a response in a zone of interest in the subterranean formation based on the modeling, the operations comprising:
constructing a multi-scale or multi-grid finite element mesh from a formation geometry included in raw data on the subterranean formation;
generating multiple realizations of a static coarse or fine scale petrophysical and geomechanical property model based on the multi-scale or multi-grid finite element mesh;
generating a multi-scale or multi-grid finite element dynamic simulation model of the subterranean formation for each realization of the static coarse or fine scale petrophysical and geomechanical property model;
deriving the response in the zone of interest in the subterranean formation from at least one of realizations of the multi-scale or multi-grid finite element dynamic simulation model, wherein the response is derived in the form of one or more displacement fields for solid phases and one or more pressure fields for fluid phases in the zone of interest in the subterranean formation; and
applying information representative of the response in the zone of interest in the subterranean formation to model the subterranean formation.

14. The system claim 13, wherein the operations include displaying at least one of the multi-scale or multi-grid finite element dynamic simulation models of the subterranean formation at the display device.

15. The system of claim 14, wherein each realization of the multi-scale or multi-grid finite element dynamic simulation model comprises N-phasic finite element model representing a fully coupled analysis of multi-phase compositional fluid flow and heat flow in nonlinearly deforming porous solid media with time-dependent failure.

16. The system of claim 13, further comprising an N-phasic finite element agent in communication with the central processing unit.

17. The system of claim 16, wherein the N-phasic finite element agent is configured to generate at least one of the multi-scale or multi- grid finite element mesh, the multiple realizations of the static coarse or fine scale petrophysical and geomechanical property model, and the realizations of the multi-scale or multi-grid finite element dynamic simulation model.

18. The system of claim 13, wherein each sand coarse or fine scale petrophysical and geomechanical property model is generated using at least one of a co-kriging technique, a co-simulation technique, a kriging technique, a Monte-Carlo technique, and a time-marching alteration of reservoir permeability and reservoir porosity.

19. The system of claim 13, wherein each realization of the multi-scale or multi-grid finite element dynamic simulation model of the subterranean formation yields a probability distribution of at least one of a displacement and stress field in the formation solid phase, a pressure field in formation fluid phase, a ratio of oil to gas, a watercut rate, and reservoir subsidence.

20. The system of claim 13, wherein each realization of the multi-scale or multi-grid finite element dynamic simulation model is generated by simultaneously calculating statistical bounds of at least one of flow and pressure of formation fluids and calculating statistical bounds of displacement of rock material and any derived quantities thereof.

21. The system of claim 13, further comprising calibrating each realization of the multi-scale or multi-grid finite element dynamic simulation model by comparing results from the multi-scale or multi-grid finite element dynamic simulation model to field measurements and adjusting parameters of the multi-scale or multi-grid finite element dynamic simulation model to reduce an error vector therebetween.

22. The system of claim 21, wherein error vector is derived from at least one of history matching to existing production data, four dimensional seismic measurements, wellbore stability analysis, and reservoir deformation measurements.

23. The system of claim 13, wherein, for each realization, the multi-scale or multi-grid finite element dynamic simulation model yields a simultaneous solution for formation response with respect to at least two fields selected from the group consisting of: a rock phase displacement field, a fluid phase pressure field, and a formation temperature field.

24. A non-transitory computer-readable medium storing a program that, when executed by one or more microprocessors, causes one or more microprocessors to perform operations for modeling a subterranean formation and deriving a response in a zone of interest in the subterranean formation based on the modeling, the operations comprising:
receiving raw data representative of a four dimensional subterranean formation, wherein the raw data comprises data associated with a formation geometry of the subterranean formation;
storing the raw data in an electronic database;
constructing a multi-scale or multi-grid finite element mesh from the formation geometry;
generating multiple realizations of a static coarse or fine scale petrophysical and geomechanical property model based on the finite element mesh;
generating a multi-scale or multi-grid finite element dynamic simulation model of the subterranean formation for each realization of the static coarse or fine scale petrophysical and geomechanical property model,
wherein the multi-scale or multi-grid finite element dynamic simulation model comprises a parallelized preconditioner and a matrix free solver to simultaneously derive the response in the zone of interest in the subterranean formation, wherein the response is derived in the form of one or more displacement fields for solid phases and one or more pressure fields for fluid phases in the zone of interest in the subterranean formation; and
applying information representative of response derived from at least one of the realizations for the finite element dynamic simulation models of the subterranean formation to model the subterranean formation.

25. The non-transitory computer readable medium of claim 24, wherein the operations include displaying at least one realization of the multi-scale or multi-grid finite element dynamic simulation model of the subterranean formation as an N-phasic finite element model.

26. The non-transitory computer readable medium of claim 25, wherein the N-phasic finite element model illustrates a fully coupled analysis of fluid flow and heat flow in a linear porous solid or a fully coupled analysis of multiphase compositional fluid flow and heat flow in nonlinearly deforming porous solid media with time-dependent failure.

27. The non-transitory computer readable medium of claim 26, where the operations include: generating a constitutive model from material property raw data, and using initial conditions as a starting point to generate a potential reservoir production condition.

28. The non-transitory computer readable medium of claim 24, wherein each static coarse or scale petrophysical and geomechanical property model is obtained using at least one of co-kriging technique, a co-simulation technique, a kriging technique, a Monte-Carlo technique, and a time-marching alteration of reservoir permeability and reservoir porosity.

29. The non-transitory computer readable medium of claim 24, wherein each realization of the multi-scale or multi-grid finite element dynamic simulation model of the subterranean formation yields a probability distribution of at least one of a displacement and stress field in the formation solid phase, a pressure field in formation fluid phase, a ratio of oil to gas, a watercut rate, and reservoir subsidence.

30. The non-transitory computer readable medium of claim 24, wherein each realization of the multi-scale or multi-grid finite element dynamic simulation model is generated by simultaneously calculating statistical bounds of at least one of flow and pressure of formation fluids and calculating statistical bounds of displacement of rock material and any derived quantities thereof.

31. The non-transitory computer readable medium of claim 24, where the operations include: calibrating each realization of the multi-scale or multi-grid finite element dynamic simulation model by comparing results from the multi-scale or multi-grid finite element dynamic simulation model to field measurements and adjusting parameters of the multi-scale or multi-grid finite element dynamic simulation model to reduce an error vector therebetween.

32. The non-transitory computer readable medium of claim 31, wherein the error vector is derived from at least one of history matching to existing production data, four dimensional seismic measurements, wellbore stability analysis, and reservoir deformation measurements.

33. A method for modeling a subterranean formation and deriving a response in a zone of interest in the subterranean formation based on the modeling, the method comprising:
collecting, by a processor, raw data on the subterranean formation, wherein the raw data comprises data associated with a formation geometry of the subterranean formation;
storing, by the processor, the raw data in an electronic database;
generating, by the processor, multiple realizations of a static coarse or fine scale petrophysical and geomechanical property model by electronically processing the raw data;
generating, by the processor, a multi-scale or multi-grid finite element dynamic simulation model of the subterranean formation for each realization of the static coarse or fine scale petrophysical and geomechanical property model, wherein generating the multi-scale or multi-grid finite element dynamic simulation model includes simultaneously calculating statistical bounds of:
at least one of flow and pressure formation fluids; and
displacement of rock material and any derived quantities thereof;
deriving, by the processor, the response in the zone of interest in the subterranean formation from at least one of the realizations of the multi-scale or multi-grid finite element dynamic simulation model, wherein the response is derived in the form of one or more displacement fields for solid phases and one or more pressure fields for fluid phases in the zone of interest in the subterranean formation; and
displaying, by the processor, information representative of the response in the zone of interest in the subterranean formation derived from the at least one realization of the multi-scale or multi-grid finite element dynamic simulation model of the subterranean formation at a display device.

* * * * *

UNITED STATES PATENT AND TRADEMARK OFFICE
CERTIFICATE OF CORRECTION

PATENT NO. : 10,590,762 B2
APPLICATION NO. : 13/584345
DATED : March 17, 2020
INVENTOR(S) : Elan Yogeswaren It is certified that error appears in the above-identified patent and that said Letters Patent is hereby corrected as shown below:

In the Claims

At Column 18, Claim number 1, Line number 37, delete "based on, the multi-scale" and replace with --based on the multi-scale--.
At Column 18, Claim number 4, Line number 64, delete "filly coupled" and replace with --fully coupled--.
At Column 19, Claim number 10, Line number 32, delete "mode field measurements" and replace with --model to field measurements--.
At Column 19, Claim number 10, Line number 34, delete "an error or therebetween" and replace with --an error vector therebetween--.
At Column 19, Claim number 12, Line number 41, delete "in the multi-scale" and replace with --wherein the multi-scale--.
At Column 19, Claim number 13, Line number 51, delete "central processing unit" and replace with --a central processing unit--.
At Column 20, Claim number 13, starting at Line number 14, delete "at least one of realizations" and replace with --at least one of the realizations--.
At Column 20, Claim number 14, Line number 24, delete "system claim 13" and replace with --system of claim 13--.
At Column 20, Claim number 15, Line number 30, delete "comprises N-phasic" and replace with --comprises an N-phasic--.
At Column 20, Claim number 18, Line number 44, delete "sand course" and replace with --static course--.
At Column 21, Claim number 22, Line number 4, delete "wherein error vector" and replace with --wherein the error vector--.
At Column 21, Claim number 24, Line number 17, delete "causes one or more" and replace with --causes the one or more--.
At Column 21, Claim number 28, Line number 65, delete "or scale petrophysical" and replace with --or fine scale petrophysical--.
At Column 21, Claim number 28, Line number 67, delete "one of co-kriging technique" and replace with --one of a co-kriging technique--.

Signed and Sealed this
Fourteenth Day of July, 2020

Andrei Iancu
*Director of the United States Patent and Trademark Office*

At Column 22, Claim number 33, Line number 54, delete "and pressure formation fluids" and replace with --and pressure of formation fluids--.